United States Patent Office
3,511,852
Patented May 12, 1970

3,511,852
N-(SUBSTITUTED PHENYL) - 1,2,3,4,-9,9-HEXA-
CHLORO - 1,4,4a,5,6,7,8,8a - OCTAHYDRO-1,4-
METHANONAPHTHALENE - 6,7 - DICARBOX-
IMIDES
Carleton W. Roberts, Midland, and Gale D. Travis,
Shepherd, Mich., assignors to The Dow Chemical
Company, Midland, Mich., a corporation of Del-
aware
No Drawing. Continuation-in-part of application Ser. No.
434,709, Feb. 23, 1965. This application Aug. 12, 1968,
Ser. No. 751,711
Int. Cl. C07d 27/30
U.S. Cl. 260—326
7 Claims

ABSTRACT OF THE DISCLOSURE 1,2,3,4,9,9 - hexachloro - 1,4,4a,5,6,7,8,8a - octahydro-
1,4 - methanonaphthalene-6,7-dicarboximides bearing a
halophenyl, nitrophenyl or halonitrophenyl substituent on
the imide nitrogen are useful as pesticides for the control
of microorganisms, insects, mites and helminths.

CROSS REFERENCE TO RELATED APPLICATION

This application is a continuation-in-part of our copend-
ing application, Ser. No. 434,709, filed Feb. 23, 1965, now
Pat. No. 3,440,248, issued Apr. 22, 1969.

SUMMARY OF THE INVENTION

The present invention is concerned with novel hexa-
chloro - octahydro - methanonaphthalene - dicarboximides
and is particularly directed to substituted 1,2,3,4,9,9-hexa-
chloro-1,4,4a,5,6,7,8,8a - octahydro - 1,4 - methanonaph-
thalene - 6,7 - dicarboximides characterized by having the
imide nitrogen substituted with a halophenyl, nitrophenyl
or halonitrophenyl substituent wherein halo represents
bromo or chloro. The new compounds are normally solids,
somewhat soluble in various organic solvents and of low
solubility in water, and have been found useful as para-
siticides.

The compounds of the invention may be prepared by
reacting 1,2,3,4,9,9 - hexachloro - 1,4,4a,5,6,7,8,8a - octa-
hydro-1,4-methanonaphthalene-6,7-dicarboxylic anhydride
with a haloaniline, nitroaniline or halonitroaniline, such
as 3-chloroaniline, 4-chloroaniline,2-nitroaniline, 4-nitro-
aniline, 2,4 - dinitroaniline, 4 - chloro - 2 - nitroaniline,
2-chloro-4-nitroaniline and the like. The reaction of the
anhydride reactant and the substituted aniline reactant is
in all instances conveniently carried out in the presence
of an inert liquid as a reaction medium. The employment
of such medium, or the identity of the inert liquid em-
ployed, is not critical; however, the use of the medium
provides for the dispersion and contacting of the reactants,
and is preferred. Representative inert liquids include hy-
drocarbons, such as benzene, hexane, and toluene; chlo-
rinated hydrocarbons, such as dichloromethane; ethers;
ketones, such as acetone; and N,N-disubstituted amides,
such as dimethylformamide. Preferably, acetone or di-
methylformamide is employed as inert liquid reaction
medium.

The reaction of the anhydride reactant and the sub-
stituted aniline reactant goes forward at temperatures
over a wide range, for example, from about 80° C. to
200° C. The use of temperatures in excess of about 90°
C. results in the predominant preparation of the desired
products. The reaction goes forward under atmospheric
pressures of a wide range; however, no advantage ordi-
narily results from the use of subatmospheric or super-
atmospheric pressures, and, therefore, the preparation is
ordinarily carried out at atmospheric pressures.

The amounts of the reactants to be employed are not
critical, some of the desired product resulting when the
reactants are employed in any amounts. However, in the
preparation of said product the reactants are consumed
in amounts which represent equimolecular proportions.
Thus, it is usually preferred to supply the anhydride re-
actant and the substituted aniline reactant in amounts
representing equimolecular proportions. The reaction ordi-
narily goes forward rapidly, with the preparation of the
desired product in the reaction mixture and in good yield.
Sometimes it is preferred to permit the reaction mixture
to stand for a period of time, in order to assure completion
of the reaction. Following the completion of the reaction,
or when the reactants have been contacted for as long
a period of time as is desired, the product-containing re-
action mixture can be employed for the useful purposes
of the present invention. Alternatively, the product can
be separated from the reaction mixture by conventional
separation procedures, such as, for example, filtration,
decantation, evaporation under subatmospheric pressure
of the inert liquid reaction medium, and the like.

The separated product can be employed for the useful
purposes of the present invention, or can be purified by
conventional procedures before being so employed. Rep-
resentative purification procedures include washing with
an appropriate liquid which is a solvent for impurities but
not for the product; recrystallization and the like.

DESCRIPTION OF PREFERRED EMBODIMENTS

The following examples illustrate the invention but are
not to be construed as limiting the same.

EXAMPLE 1

21.2 grams (0.05 mole) of 1,2,3,4,9,9-hexachloro,1,4,
4a,5,6,7,8,8a-octahydro - 1,4 - methanonaphthalene - 6,7-
dicarboxylic anhydride and 6.38 grams (0.05 mole) of
4-chloroaniline are dispersed in 50 milliliters of dimethyl-
formamide in a reaction vessel equipped with a thermom-
eter and a reflux condenser. The resulting slurry is heated
to the reflux temperature of about 152–153° C. to produce
a clear solution in the reaction vessel. The reaction mix-
ture is maintained at the reflux temperature for two hours,
cooled to room temperature and slowly added with stir-
ring to 400 milliliters of an ice-water mixture to pre-
cipitate the reaction product as a white solid. The result-
ing mixture is allowed to stand for sixteen hours and
then filtered and the filter cake washed with 100 milli-
liters of cold water. The filter cake is dried in a vacuum
oven for sixteen hours at 100° C. and the resulting dry
crude product recrystallized from 100 milliliters of toluene
to produce the desired N(4 - chlorophenyl) - 1,2,3,4,9,9-
hexahydro-1,4,4a,5,6,7,8,8a-octahydro - 1,4-methanonaph-
thalene-6,7-dicarboximide product as a solid melting at
180°–182° C. Elemental analysis showed a composition
in agreement with the theoretical composition of the named
compound.

EXAMPLE 2

The procedure of Example 1 is repeated except that 6.5
grams (0.05 mole) of 4-bromoaniline is employed in
place of the 4-chloroaniline of Example 1 to obtain the
N - (4-bromophenyl)-1,2,3,4,9,9-hexachloro-1,4,4a,5,6,7,
8,8a - octahydro - 1,4-methanonaphthalene-6,7-dicarboxi-
mide product as a solid melting at 203°–205° C. after
recrystallization from toluene. Elemental analysis con-
firmed the composition of the named compound.

EXAMPLE 3

N - (2-nitrophenyl)-1,2,3,4,9,9-hexachloro-1,4,4a,5,6,7,8,
8a - octahydro - 1,4-methanonaphthalene-6,7-dicarboxi-
mide 1,2,3,4,9,9 - hexachloro-1,4-4a,5,6,7,8,8a-octahydro-1,4- methanonaphthalene-6,7-dicarboxylic anhydride (21.2 grams; 0.05 mole), 2-nitroaniline (6.91 grams; 0.05 mole), and 50 milliliters of dimethylformamide are mixed together to obtain a reaction mixture. The reaction mixture is heated to reflux temperature of about 152°–153° C., and found under this circumstance to be a clear solution. The reaction mixture is maintained at reflux temperature for 4 hours, cooled to room temperature, and diluted with 400 milliliters of ice and water at a temperature of about 0° C. to obtain a reaction mixture containing the N(2-nitrophenyl) - 1,2,3,4,9,9 - hexachloro-1,4,4a,5,6,7,8,8a-octahydro - 1,4 - methanonaphthalene-6,7-dicarboximide product as a white precipitate therein. The reaction mixture containing this product precipitate is permitted to stand for 12 hours and the product precipitate separated from the reaction mixture by suction filtration. The separated product is washed with 100 milliliters of cold water and thereafter dried by being subjected to subatmospheric pressure at 100° C. for 16 hours. The dried product is purified by recystallization from 400 milliliters of toluene. In a representative preparation in accordance with these procedures the product obtained was found to soften at 260° C., and to melt at 309°–311° C. Elemental analysis showed: C, 42.32 percent; H, 2.13 percent; N, 5.14 percent; and Cl, 39.46 percent; calculated for $C_{19}H_{12}Cl_6N_2O_4$, C, 41.87 percent; H, 2.22 percent; N, 5.14 percent; and Cl, 39.03 percent.

EXAMPLE 4

The procedure of Example 3 is repeated except that 6.91 grams (0.05 mole) of 4-nitroaniline is employed instead of the 2-nitroaniline of said example and the crude product is obtained as a yellow precipitate. The latter is collected by filtration, dried under vacuum for 12 hours at 100° C. and recrystallized from 100 milliliters of toluene to obtain the N-(4-nitrophenyl)-1,2,3,4,9,9-hexachloro - 1,4,4a,5,6,7,8,8a-octahydro-1,4-methanonaphthalene-6,7-dicarboximide as a solid, melting at 275°–278° C.

EXAMPLES 5–9

Following the general procedures of Examples 1 and 3, 1,2,3,4,9,9 - hexachloro - 1,4,4a,5,6,7,8,8a-octahydro-1,4-methanonaphthalene-6,7-dicarboxylic anhydride is reacted with an equimolar proportion of 4-chloro-2-nitroaniline or 2-chloro-4-nitroaniline to obtain, respectively, N-(4-chloro - 2-nitrophenyl)-1,2,3,4,9,9-hexachloro-1,4,4a,5,6, 7,8,8a - octahydro-1,4-methanonaphthalene-6,7-dicarboximide as a solid, melting at 180°–182° C. and N(2-chloro-4 - nitrophenyl) - 1,2,3,4,9,9-hexachloro-1,4,4a,5,6,7,8,8a-octahydro-1,4-methanonaphthalene-6,7-dicarboximide as a solid, melting at 261°–265° C.

In exactly similar fashion, employing 4-bromo-2-nitroaniline or 4-chloro-3-nitroaniline in place of the above substituted aniline reactants, there are obtained, respectively, N-(4-bromo-2-nitrophenyl)-1,2,3,4,9,9-hexachloro-1,4,4a,5,6,7,8,8a - octahydro-1,4-methanonaphthalene-6,7-dicarboximide, having a molecular weight of 624 and N-(4-chloro - 3-nitrophenyl)-1,2,3,4,9,9-hexachloro-1,4,4a,5,6, 7,8,8a - octahydro-1,4-methanonaphthalene-6,7-dicarboximide having a molecular weight of 579.5.

The products of the present invention are variously useful as parasiticides, for example, as arachnicides for the control of mites such as two-spotted spider mites and as bactericides and fungicides for the control of microorganisms such as soil bacteria, fire blight bacteria, rice blast organisms, citrus green mold, pathogenic yeasts and staphylococci. For such uses the product may be employed directly or may be distributed with the aid of a carrier. In such operations the active dicarboximide compounds may be dispersed in or on an inert finely divided or granular solid. The resulting augmented compositions can be applied directly, for example, to plants or soil or may be employed as concentrates suitable for admixture with additional finely-divided solid to produce dusting compositions or for dispersal in water as wettable powders.

Alternatively, the active compounds can be applied in organic solvent solutions or in the form of oil-in-water or water-in-oil emulsions.

In representative operations, compounds of the invention were dissolved in a minimal amount of acetone and dispersed in water to produce aqueous compositions containing 100 parts by weight of one of the active dicarboximide compounds as the sole toxicant per million parts of aqueous composition. Each such composition was applied to wet a separate portion of nutrient agar medium previously inoculated with a test organism. The agar media were then incubated under conditions conductive to growth of the test organism concerned. Similarly inoculated media without treatment with a toxicant composition were similarly incubated to serve as checks. When the check media showed vigorous growth of test organisms the treated media were observed to ascertain the extent of growth of test organisms thereon. In such operations, 100 percent kill and control of growth of rice blast organisms was obtained employing N(4-chlorophenyl)-1,2,3,4,9,9-hexachloro - 1,4,4a,5,6,7,8,8a-octahydro-1,4-methanonaphthalene-6,7-dicarboximide or N(4-bromophenyl)-1,2,3,4,9,9-hexachloro - 1,4,4a,5,6,7,8,8a - octahydro - 1,4-methanonaphthalene-6,7-dicarboximide as sole toxicant. In further operations in exactly similar fashion, 100 percent kill and control of *Staphylococcus aureus* organisms was obtained employing N - (4-chloro-2-nitrophenyl)-1,2,3,4,9,9-hexachloro - 1,4,4a,5,6,7,8,8a-octahydro-1,4-methanonaphthalene-6,7-dicarboximide or N-(2-chloro-4-nitrophenyl)-1,2, 3,4,9,9 - hexachloro-1,4,4a,5,6,7,8,8a-octahydro-1,4-methanonaphthalene-6,7-dicarboximide as sole toxicant.

In further representative operations, aqueous compositions are perpared in the foregoing manner to contain 600 parts by weight of one of the active dicarboximide compounds per million parts of aqueous composition. Each such composition is applied to a separate stand of young bean plants infested with two-spotted spider mites. Sufficient of the composition is applied to wet the foliage of the plants thoroughly. On observation four days later it is found that substantially complete kill and control of the spider mites is accomplished employing N(4-nitrophenyl)-1,2,3,4,9,9 - hexachloro - 1,4,4a,5,6,7,8,8a-octahydro-1,4-methanonaphthalene - 6,7 - dicarboximide or N(2-chloro - 4 - nitrophenyl) - 1,2,3,4,9,9-hexachloro-1,4,4a,5,6,7,8,8a - octahydro - 1,4 - methanonaphthalene-6,7-dicarboximide as the sole toxicant in said aqueous compositions.

The 1,2,3,4,9,9 - hexachloro - 1,4,4a,5,6,7,8,8a-octahydro-1,4-methanonaphthalene - 6,7 - dicarboxylic anhydride employed as a starting material in the preparation of the compounds of the present invention is itself prepared in known procedures which comprise the Diels-Alder type reaction of hexachlorocyclopentadiene and tetrahydrophthalic anhydride at a temperature range of 150°–200° C. Preferably, the reaction is carried out in an inert liquid reaction media, for example, a hydrocarbon such as heptane, toluene, xylene, or ethylbenzene, or a halogenated hydrocarbon, such as chlorobenzene or dichlorobenzene. The reactants are consumed in equimolecular amounts, and are preferably supplied in such amounts. The desired anhydride is obtained as a precipitate in the reaction mixture; this product precipitate can be separated from the reaction mixture, preferably by filtration, and, if desired, purified, as by recrystallization from a suitable solvent.

We claim:
1. A N-(substituted phenyl) - 1,2,3,4,9,9-hexachloro-1,4,4a,5,6,7,8,8a - octahydro - 1,4 - methanonaphthalene-6,7-dicarboximide compound, wherein the substituted phenyl is monohalophenyl, mononitrophenyl, or monohalomononitrophenyl, and the halo substituent is bromo or chloro.

2. The compound of claim 1 which is N-(2-nitrophenyl) - 1,2,3,4,9,9 - hexachloro - 1,4,4a,5,6,7,8,8a-octahydro-1,4-methanonaphthalene-6,7-dicarboximine.

3. The compound of claim 1 which is N-(4-chlorophenyl) - 1,2,3,4,9,9 - hexachloro - 1,4,4a,5,6,7,8,8a-octahydro-1,4-methanonaphthalene-6,7-dicarboximide.

4. The compound of claim 1 which is N-(4-bromophenyl) - 1,2,3,4,9,9 - hexachloro - 1,4,4a,5,6,7,8,8a-octahydro-1,4-methanonaphthalene-6,7-dicarboximide.

5. The compound of claim 1 which is N-(4-nitrophenyl) - 1,2,3,4,9,9 - hexachloro - 1,4,4a,5,6,7,8,8a-octahydro-1,4-methanonaphthalene-6,7-dicarboximide.

6. The compound of claim 1 which is N-(4-chloro-2-nitrophenyl) - 1,2,3,4,9,9-hexachloro-1,4,4a,5,6,7,8,8a-octahydro-1,4-methanonaphthalene-6,7-dicarboximide.

7. The compound of claim 1 which is N-(2-chloro-4-nitrophenyl) - 1,2,3,4,9,9-hexachloro-1,4,4a,5,6,7,8,8a-octahydro-1,4-methanonaphthalene-6,7-dicarboximide.

References Cited

UNITED STATES PATENTS 3,280,143  10/1966  Hayes _____ 260—326

OTHER REFERENCES

Chemical Abstracts, vol. 65, p. 16, 921c (1966).

ALEX MAZEL, Primary Examiner

JOSE TOVAR, Assistant Examiner

U.S. Cl. X.R.

424—274